United States Patent [19]

Buljan et al.

[11] 4,073,845

[45] Feb. 14, 1978

[54] HIGH DENSITY HIGH STRENGTH $Si_3N_4$ CERAMICS PREPARED BY PRESSURELESS SINTERING OF PARTLY CRYSTALLINE, PARTLY AMORPHOUS $Si_3N_4$ POWDER

[75] Inventors: Sergej Tomislav Buljan, Towanda, Pa.; Philip Eli Stermer, Waverly, N.Y.

[73] Assignee: GTE Sylvania Incorporated, Stamford, Conn.

[21] Appl. No.: 653,507

[22] Filed: Jan. 29, 1976

[51] Int. Cl.² ............... C04B 33/32; C04B 35/58
[52] U.S. Cl. ................... 264/65; 106/57; 106/58; 106/65; 106/73.2; 106/73.5; 423/344
[58] Field of Search .............. 423/344; 106/73.5; 264/65

[56] References Cited

U.S. PATENT DOCUMENTS

| | | | |
|---|---|---|---|
| B 581,564 | 3/1976 | Jacobson | 423/344 X |
| 3,352,637 | 11/1967 | Heymer et al. | 423/344 |
| 3,409,417 | 11/1968 | Yates | 29/182.5 |
| 3,811,928 | 5/1974 | Henney et al. | 106/69 |
| 3,903,230 | 9/1975 | Kamigaito et al. | 264/65 |
| 3,950,464 | 4/1976 | Masaki | 106/73.5 |
| 3,953,221 | 4/1976 | Lange | 106/73.5 |
| 3,969,125 | 7/1976 | Komeya et al. | 106/73.5 |
| 3,989,782 | 11/1976 | Lumby et al. | 106/73.5 |
| 3,991,148 | 11/1976 | Lumby et al. | 106/73.5 |
| 3,991,166 | 11/1976 | Jack et al. | 106/73.5 |
| 3,992,497 | 11/1976 | Terwilliger et al. | 106/73.5 |
| 4,036,653 | 7/1977 | Jacobsen | 423/344 X |

FOREIGN PATENT DOCUMENTS

| | | | |
|---|---|---|---|
| 47-11,803 | 4/1972 | Japan | 106/73.5 |
| 1,199,811 | 7/1970 | United Kingdom. | |

OTHER PUBLICATIONS

Crandall, W. B. et al. –"Preparation and Evaluation of Si–Al–O–N" IIT. Research-Institute Chicago, June 1973, Report Prepared for Aerospace Research -- Laboratories – pp. 42, 8–10.

Rice, R. W. et al. "Hot-Pressed $Si_3N_4$ with Zr Based Additions" J. Am. Cer. Soc. 58 (5–6) (1975) p. 264.

Deeley, G. G. et al. "Dense Silicon Nitrite" Powder Met. 8 (1961) pp. 145–151.

*Primary Examiner*—Helen M. McCarthy
*Attorney, Agent, or Firm*—Norman J. O'Malley; John C. Fox; Donald R. Castle

[57] ABSTRACT

$Si_3N_4$ ceramics exhibiting densities and modulus of rupture values heretofore obtainable only by hot pressing are produced by pressureless sintering of powder compacts of partly amorphous, partly crystalline $Si_3N_4$ powder containing between 5 and 60 percent by weight of crystalline material.

15 Claims, 3 Drawing Figures

HIGH DENSITY HIGH STRENGTH $Si_3N_4$ CERAMICS PREPARED BY PRESSURELESS SINTERING OF PARTLY CRYSTALLINE, PARTLY AMORPHOUS $Si_3N_4$ POWDER

BACKGROUND OF THE INVENTION

This invention relates to high density, high strength $Si_3N_4$ ceramics produced by pressureless sintering of $Si_3N_4$ powder compacts, and more particularly relates to such ceramics produced from partly amorphous, and partly crystalline $Si_3N_4$ powder.

$Si_3N_4$ has generated considerable interest recently as a possible substitute for superalloys in applications requiring high strength at elevated temperatures and good resistance to thermal shock and corrosion, an outstanding example of which is turbine engine components. Optimization of the physical properties of this material, particularly high temperature strength, holds out the promise of significant increases in the operating temperatures and efficiencies of turbine engines over those possible with superalloy components. Such optimization is dependent on the ability to produce bodies of high purity and high density.

Highest densities are at present obtained commercially by hot pressing powders obtained by nitridation of silicon at elevated temperatures. Such powders typically have an average particle size of about 4 microns to 10 microns and contain from 1 to several percent of impurities. See, for Example, *Powder Metallurgy*, 1961, number 8, page 145.

Copending U.S. patent application Ser. No. 625,330 filed Oct. 23, 1975 and assigned to the present assignee, describes a technique for producing high purity fine grain $Si_3N_4$ powder, based upon the vapor phase reaction of a silicon halide compound with ammonia. This powder possesses a purity of at least 99.9 percent, an average particle size below one micron and typically about 0.4 microns and an adsorbed oxygen content typically less than 4 percent by weight, which may be subsequently reduced to less than 1 percent by heating the powder in dry nitrogen or other nonreactive atmosphere. In addition, the powder is characterized as being in the amorphous state, but can be crystallized e.g., by heating in a nonreactive atmosphere at a temperature in the range of from about 1550° to 1600° C for several hours.

SUMMARY OF THE INVENTION

In accordance with the invention, it has been discovered that $Si_3N_4$ ceramics exhibiting densities and modulus of rupture values previously obtainable only by hot pressing, may be prepared by the pressureless sintering of powder compacts containing a critical ratio of amorphous and crystalline $Si_3N_4$.

Starting material containing from 5 to 60 weight percent of crystalline $Si_3N_4$ remainder substantially amorphous, when thoroughly mixed with appropriate binders, pressed to form a powder compact of adequate green strength and density, and sintered without pressure at about 1400° to 1700° C for at least about one hour, yields a $Si_3N_4$ ceramic body having a density of at least 90 percent of theoretical density, leading to high strength as indicated, for example, by modulus of rupture. To date, densities as high as 96 percent of theoretical density and room temperature modulus of rupture values approaching 100,000 pounds per square inch have been obtained.

Shrinkage of the powder compact during sintering, as well as density and modulus of rupture values of the sintered ceramic, may be optimized by control of the percent of crystalline $Si_3N_4$ present in the starting powder within the critical range.

DETAILED DESCRIPTION OF THE INVENTION

Figure 1:
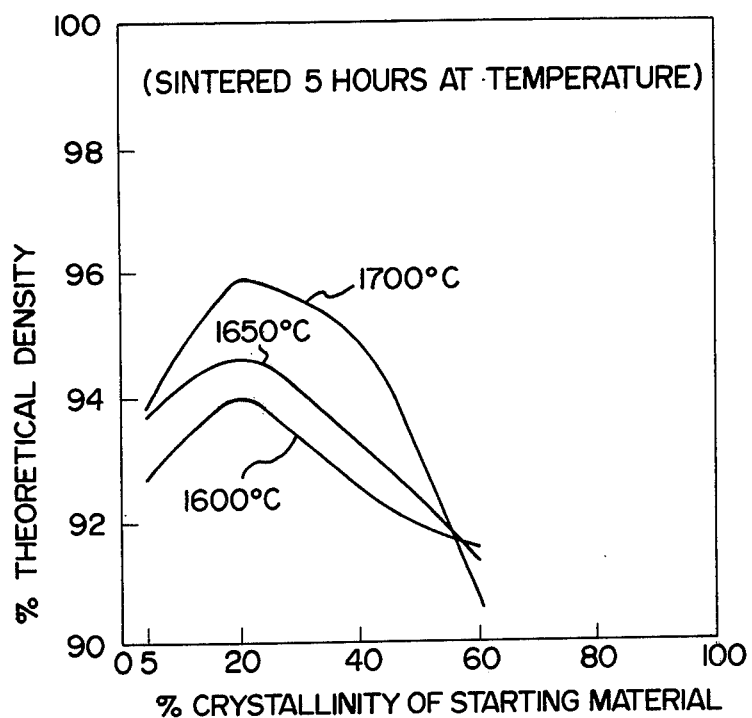
FIG. 1 is a graph of density (as a percent of theoretical density) of the $Si_3N_4$ ceramics of the invention after sintering for 5 hours at various temperatures versus percent crystallinity of the starting $Si_3N_4$ powder.

For a better understanding of the present invention, together with other and further objects, advantages and capabilities thereof, reference is made to the following disclosure and appended claims in connection with the above-described drawings.

The $Si_3N_4$ starting material may be amorphous material (herein, the term "amorphous" refers to a short range order solid material as indicated by its lack of x-ray defraction intensity peaks and by broad infrared absorption peaks), amorphous material which has been partly crystallized by heat treatment, or may be a mixture of substantially completely amorphous material and substantially completely crystalline material.

The average particle size of the starting material should be below about 3 microns and preferably below about 1 micron, above which the particle size would tend to have a deleterious effect upon the strength of the sintered ceramic.

By way of example, one method suitable for obtaining amorphous $Si_3N^4$ powder of the requisite purity and particle size will be described. It is to be understood however that any other techniques capable of yielding such starting material are also satisfactory for the practice of the invention.

The method to be described is set forth in detail in copending patent application Ser. No. 625,330, filed Oct. 23, 1975, and assigned to the present assignee.

The reactants, $SiCl_4$ and $NH_3$, of the desired purity are introduced into the reaction apparatus at a point where the temperature is at least 100° C. The temperature of the reaction zone should be maintained between 1100° and 1350° C.

A suitable diluent gas, provided it is of the requisite purity and is nonreactive, may be present in the reaction chamber. The gas pressure in the reaction zone should be at least atmospheric in order for the product to be produced in particulate form. Typical diluent gases include nitrogen, argon, and helium. Since the finely divided product is susceptible to oxidation, the diluent gas or other inert atmosphere or vacuum should be maintained in contact with the product until it is cooled to below at least 100° C.

The mole ratio of $NH_3$ to $SiCl_4$ should preferably be maintained within the range of 1.25 to 15.

The $NH_4Cl$ by-product may be removed from the product in a separate step by heating in a non-oxidizing atmosphere or vacuum above about 340° C, the sublimation temperature of NH₄Cl.

Some oxygen, typically less than about 4 weight percent of the product may also be adsorbed on the powder and may be reduced to less than about 1 percent by heating the powder in dry nitrogen or other nonreactive atmosphere.

The $Si_3N_4$ powder product obtained by the above method is characterized by an amorphous structure. Crystallization of this structure may be achieved by heating the powder in a nonreactive environment at a temperature of from about 1500° to 1600° C for several hours, for example, from 3 to 8 hours.

The starting $Si_3N_4$ powder for preparing the ceramic bodies of the invention may either be partly crystallized amorphous material or a mixture of substantially completely amorphous and substantially completely crystalline material. The crystalline $Si_3N_4$, which may be either the alpha or the beta polymorph or a mixture of these, should be present in the amount of from 5 to 60 weight percent of the total amount of $Si_3N_4$ powder, the remainder being substantially amorphous. $Si_3N_4$ ceramics produced from such starting materials exhibit good to excellent densities and modulus of rupture values, as well as acceptable shrinkage values of the powder compacts during sintering. The $Si_3N_4$ starting material may be modified with one or more of certain well known additives, such as grain growth inhibitors or sintering aids, effective in amounts up to about 20 weight percent of total. By way of example, sintering additives include $MgO$, $CrN$, $Y_2O_3$, $ZrO_2$, $ZrN$, and $La_2O_3$.

In accordance with a preferred embodiment, the starting $Si_3N_4$ contains from about 10 to 30 weight percent crystalline material, remainder substantially amorphous material, and up to about 5 weight percent of at least one sintering additive such as MgO. $Si_3N_4$ ceramics produced from such starting materials exhibit optimum density, modulus of rupture and shrinkage values.

The percent crystallinity of the starting material, if unknown, may be determined either by x-ray diffraction techniques, in which the intensity of the diffraction peaks of crystalline material is compared to a standard, or by infrared spectroscopy, in which the relative intensities of the broad absorption peak of the amorphous material and the narrow peaks of the crystalline material are compared.

The starting material may be processed to a powder compact of adequate green strength by thoroughly mixing starting materials and any binders or pressing aids which may be employed, such as by ball milling in a non-reactive liquid medium, such as toluene or methanol and consolidating the mixture such as by pressing, extruding, or slip casting. Processing may also optionally include a presintering or prereacting step in which either the uncompacted powder or the powder compact is heated at moderate temperatures such as from about 500° to 1,000° C in order to remove volatile binder materials and/or to partially react the starting ceramic materials. Sintering is carried out without pressure in accordance with the invention at a temperature of from about 1400° to 1700° C for at least about one hour and preferably between 1600° and 1700° C for about 1½ to 5 hours. Sintering should of course be carried out in a nonreactive atmosphere in order to prevent formation of undesirable oxide or oxynitride phases.

EXAMPLE

In order to prepare batches for pressing of powder compacts $Si_3N_4$ powder of varying degrees of crystallinity (5, 20, 40 and 60 weight percent crystallinity), plus 5 weight percent of MgO was mixed with toluene, methanol and magnesium stearate in the amounts shown in Table I.

TABLE I

| | | |
|---|---|---|
| $Si_3N_4$ + (5 w/o MgO) | 68 | g |
| Toluene | 159.8 | g |
| Methanol | 5.44 | g |
| Magnesium stearate | 2.04 | g |

The batches were then thoroughly mixed by milling in a two quart polyethylene jar with about 2,000 grams of a grinding media for ½ hour. The resulting slurry was dried at about 105° C and the dried batch was dry ball milled in a polyethlene jar for 24 hours. To this dry ball milled batch was added 2.04 grams of carbowax, 68 grams of toluene, and 2.04 grams of methanol. It was mixed by ball milling for 15 minutes. The resulting slurry was dried at 105° C and screened through a 60 mesh screen. The minus 60 mesh fractions were pressed at 25,000 psi to obtain green powder compacts. The magnesium stearate and carbowax binders were then removed by heating the compacts at the rate of about 50° C per hour to a temperature of about 600° C and maintained at the temperature for about 4 hours in air.

Figure 2:
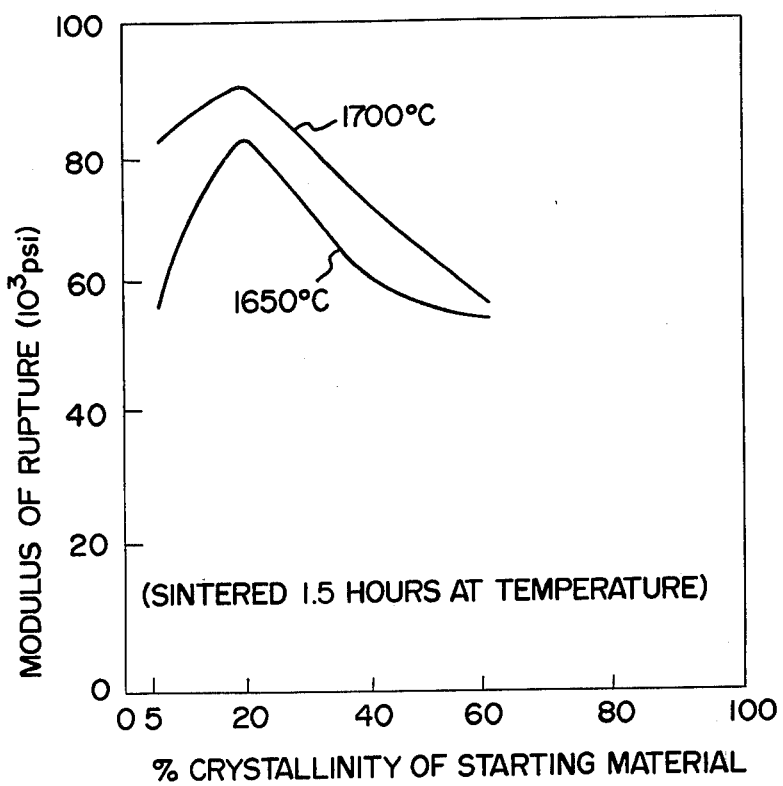
FIG. 2 is a graph of modulus of rupture values in $10^3$ psi measured at 25° C of the $Si_3N_4$ ceramics of the invention sintered for 1.5 hours at various temperatures versus percent crystallinity of the starting $Si_3N_4$ powder.
Figure 3:
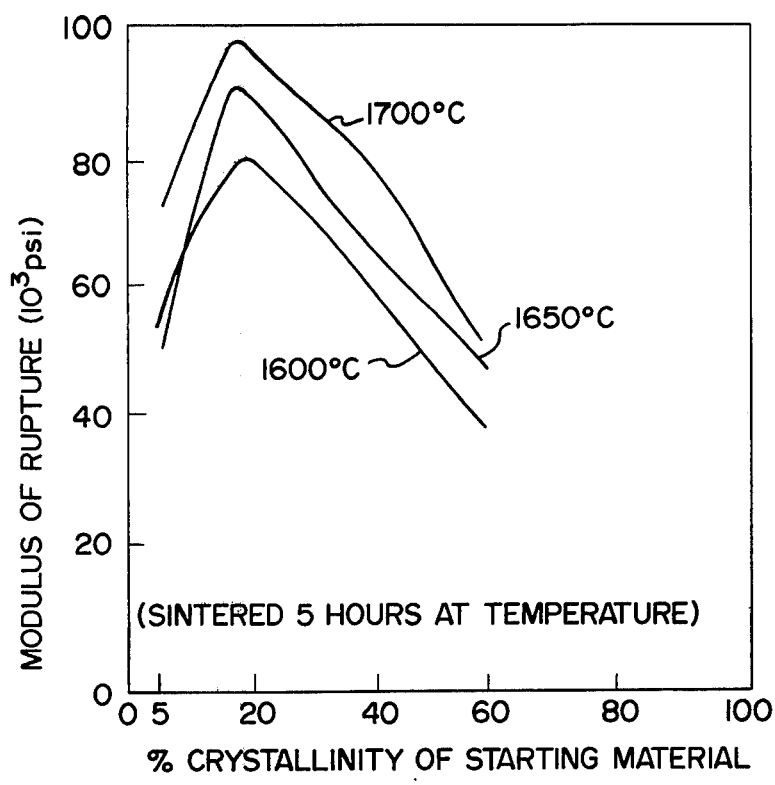
FIG. 3 is a graph similar in all respects to the graph of FIG. 2 except for a sintering time of 5 hours.

Compacts were then sintered for 1.5 and 5 hours, respectively, at 1600°, 1650° and 1700° C, respectively, and evaluated by measuring density and modulus of rupture. Results are depicted graphically in the drawing. FIG. 1 shows the effect of percent crystallinity of starting material upon density as percent of theoretical density after sintering for 5 hours at 1600°, 1650° C, and 1700° C respectively. As may be seen, density increases with increasing sintering temperature, as expected, but also increases with increasing percent crystallinity to a maximum at about 20 percent crystallinity for each sintering temperature. FIG. 2 shows the effect of percent crystallinity of starting material upon room temperature modulus of rupture (in $10^3$ psi) (MOR) after sintering for 1.5 hours at 1650° and 1700° C respectively. MOR increases with increasing sintering temperature, as expected. In addition, at each sintering temperature MOR goes through a maximum at about 20 percent crystallinity. FIG. 3 shows similar results for 5 hours of sintering. As may be seen, MOR values are higher for these longer sintering times.

While there has been shown and described what are at present considered the preferred embodiments of the invention, it will be obvious to those skilled in the art that various changes and modifications may be made therein without departing from the scope of the invention as defined by the appended claims. For example, it is known to add certain other materials to $Si_3N_4$ to form mixed systems having certain combinations of properties not otherwise obtainable. Two well-known additives are AlN and $Al_2O_3$, the latter forming with $Si_3N_4$ what are known as the Sialons. It is to be understood that the advantages of the invention are realized in such mixed systems.

What is claimed is:

1. A powder mixture consisting essentially of $Si_3N_4$ powder of average particle size below about 3 microns characterized in that the $Si_3N_4$ powder consists of from about 5 to 60 weight percent crystalline $Si_3N_4$, remainder substantially amorphous $Si_3N_4$.

2. The powder mixture of claim 1 in which the $Si_3N_4$ powder consists of from 10 to 30 weight percent crystalline $Si_3N_4$, remainder substantially amorphous $Si_3N_4$.

3. The powder mixture of claim 2 in which the $Si_3N_4$ powder consists of partially crystallized amorphous particles.

4. The powder mixture of claim 2 in which the $Si_3N_4$ powder consists of a mixture of substantially crystallized particles and substantially amorphous particles.

5. The powder mixture of claim 4 additionally containing up to 5 weight percent of a grain growth inhibiting additive selected from the group consisting of MgO, CrN, $Y_2O_3$, $ZrO_2$, ZrN, and $La_2O_3$.

6. A powder compact of the powder of claim 1 and a volatile binder to provide green strength to the compact.

7. A powder compact of the powder mixture of claim 1 and a volatile binder to provide green strength to the compact.

8. A powder compact of the powder mixture of claim 3 and a volatile binder to provide green strength to the compact.

9. A powder compact of the powder mixture of claim 4 and a volatile binder to provide green strength to the compact.

10. A powder compact of the powder mixture of claim 5 and a volatile binder to provide green strength to the compact.

11. A method of producing a ceramic body, the method comprising:
 (a) mixing starting materials consisting essentially of $Si_3N_4$ powder of average particle size below about 3 microns, the powder consisting of from about 5 to 60 weight percent crystalline $Si_3N_4$, remainder amorphous $Si_3N_4$,
 (b) consolidating the powder with a volatile binder to produce a powder compact having adequate green strength and density, and
 (c) sintering the compact in a non-reactive atmosphere without pressure at a temperature of from about 1400° to 1700° C for at least about one hour to achieve a dense $Si_3N_4$ ceramic body having a density of at least 90 and up to 96 percent of theoretical density and a room temperature modulus of rupture value approaching 100,000 psi.

12. The method of claim 11 in which the $Si_3N_4$ powder consists of from about 10 to 30 percent by weight crystalline $Si_3N_4$, remainder amorphous $Si_3N_4$.

13. The method of claim 11 in which the $Si_3N_4$ powder consists of partially crystallized amorphous particles.

14. The method of claim 11 in which the $Si_3N_4$ powder consists of a mixture of substantially crystalline particles and substantially amorphous particles.

15. The method of claim 11 in which the starting materials additionally contain up to 20 weight percent of a sintering additive selected from the group consisting of MgO, CrN, $Y_2O_3$, $ZrO_2$, ZrN, and $La_2O_3$.

* * * * *